United States Patent
Hallifax et al.

(10) Patent No.: US 6,586,131 B2
(45) Date of Patent: Jul. 1, 2003

(54) APPARATUS FOR RELEASING GASES FROM RECHARGEABLE LITHIUM ELECTROCHEMICAL CELLS DURING THE FORMATION STAGE OF MANUFACTURING

(75) Inventors: Paul Hallifax, Gasport, NY (US); Tina L. Urso, East Amherst, NY (US); David M. Spillman, Tonawanda, NY (US); Bruce Meyer, Lincoln, NE (US)

(73) Assignee: Wilson Greatbatch Ltd., Clarence, NY (US)

( * ) Notice: Subject to any disclaimer, the term of this patent is extended or adjusted under 35 U.S.C. 154(b) by 42 days.

(21) Appl. No.: 09/788,240

(22) Filed: Feb. 16, 2001

(65) Prior Publication Data

US 2002/0114991 A1 Aug. 22, 2002

(51) Int. Cl.$^7$ .................... H01M 2/12; H01M 10/04; B65D 51/16
(52) U.S. Cl. ................ 429/53; 429/55; 429/82; 29/623.2; 220/203.27
(58) Field of Search .................. 429/53, 54, 55, 429/89, 82, 231.1, 231.2, 231.3, 231.4, 231.8, 231.95; 29/623.1, 623.2; 220/203.23, 203.27

(56) References Cited

U.S. PATENT DOCUMENTS

| | | | |
|---|---|---|---|
| 1,765,027 A | 6/1930 | Mitchell | |
| 2,131,592 A | 9/1938 | Lang et al. | |
| 2,240,836 A | 5/1941 | Cotton | |
| 2,558,654 A | 6/1951 | Kendall et al. | |
| 3,096,216 A | 7/1963 | Warren | |
| 3,208,884 A | 9/1965 | Jensen | |
| 3,398,026 A | 8/1968 | André | |
| 4,298,662 A | 11/1981 | Sugalski et al. | |
| 4,338,382 A | * 7/1982 | Fritts | 429/53 |
| 4,339,054 A | * 7/1982 | Kellogg | 220/203.27 X |
| 4,430,392 A | * 2/1984 | Kelley et al. | 429/53 |
| 4,549,668 A | * 10/1985 | Krauss et al. | 220/203.27 |
| 4,556,612 A | 12/1985 | Thibault et al. | |
| 4,611,395 A | 9/1986 | Phillips et al. | |
| 5,472,802 A | * 12/1995 | Holland et al. | 429/54 |

* cited by examiner

Primary Examiner—Stephen Kalafut
(74) Attorney, Agent, or Firm—Michael F. Scalise

(57) ABSTRACT

An alkali metal secondary electrochemical cell, and preferably a lithium ion cell, provided with a removable gas relief valve, is described. The gas release valve is positioned on the casing, in fluid flow communication between the inside thereof and the exterior. This gas release valve serves to eliminate cell gases that build up inside the casing during the cell's formation stage. Once the lithium-ion cell has completed formation, the gas release valve is removed and replaced with a hermetic closure. Removal of the gas release valve and sealing of the cell takes place in an environment in which no outside gas is capable of being introduced inside the casing. The cell can also be provided in a tank filled with inert gas and a filter which separates the cell gas from the inert gas. When cell formation is completed, the cell hermetically sealed.

35 Claims, 3 Drawing Sheets

APPARATUS FOR RELEASING GASES FROM RECHARGEABLE LITHIUM ELECTROCHEMICAL CELLS DURING THE FORMATION STAGE OF MANUFACTURING

BACKGROUND OF INVENTION

1. Field of the Invention

The present invention generally relates to the conversion of chemical energy to electrical energy and, more particularly, to methods which allow gases produced during the formation stage of a cell, such as the formation stage of a lithium-ion cell, to be released from the casing before the cell is placed into service.

2. Prior Art

Lithium-ion rechargeable cell must be "formed" after assembly. Formation occurs during the first several charge-discharge cycles. During this cycling, lithium ions travel through the electrolyte from the cathode to the anode upon external charging and return to the cathode during discharging of the cell. The charge capacity exceeds the discharge capacity during the first charge-discharge cycle because not all of the lithium retained by the anode is released back to the cathode. In other words, during each cycle some of the lithium is irreversibly retained by the carbonaceous anode. This irreducible lithium causes the anode to swell. Consequently, the casing swells. Also, decomposition of the electrolyte during the formation cycles causes gases to be produced. These gases increase the pressure inside the casing and result in additional case swelling.

According to one embodiment of the present invention, a temporary one-way gas release valve is positioned on the casing, in fluid flow communication between the inside thereof and the exterior. This temporary gas release valve serves to eliminate gases that build up inside the casing during the cell's formation stage. Once the lithium-ion cell has completed formation, the temporary gas release valve is removed and replaced with a hermetic closure. Removal of the release valve and sealing of the cell takes place in an environment in which no outside gas is capable of being introduced into the casing.

Various prior art patents describe gas release valves for electrochemical cells. These include U.S. Pat. No. 3,208,884 to Jensen and U.S. Pat. No. 3,398,026 to André. However, none of them disclosure use of the release valve only during the formation stage of a lithium-ion rechargeable cell. After the formation stage is completed, the present invention release valve is removed from the cell casing and replaced with a closure means, which hermetically seals the cell.

According to another embodiment of the present invention, lithium-ion cells are formed in a housing with a temporary opening to an inert atmosphere. After formation is completed, the cell is sealed with a hermetic closure and discharged in a normal manner.

SUMMARY OF THE INVENTION

An object of the present invention is, therefore, to reduce the swelling experienced by a lithium-ion rechargeable cell by eliminating gases which form inside the casing during the cell's formation stage. One way to accomplish this is by the provision of a one-way gas release valve provided on the casing. Upon completion of cell formation, the temporary gas release valve is removed from the casing under conditions which prevent any outside gas from entering the electrochemical system. The opened casing is then closed with a hermetic seal and discharged in the usual manner. Another way to form the cell is by containing it in a housing having an inert environment, such as of nitrogen or argon. The cell has a vent opening to the inert environment during its formation stage. After formation is completed, the cell is hermetically sealed. Such batteries are particularly useful as the power source for an implantable medical device, including ventricular assist devices, defibrillators, pacemakers, neural stimulators, drug pumps and hearing aids.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

Figure 1:
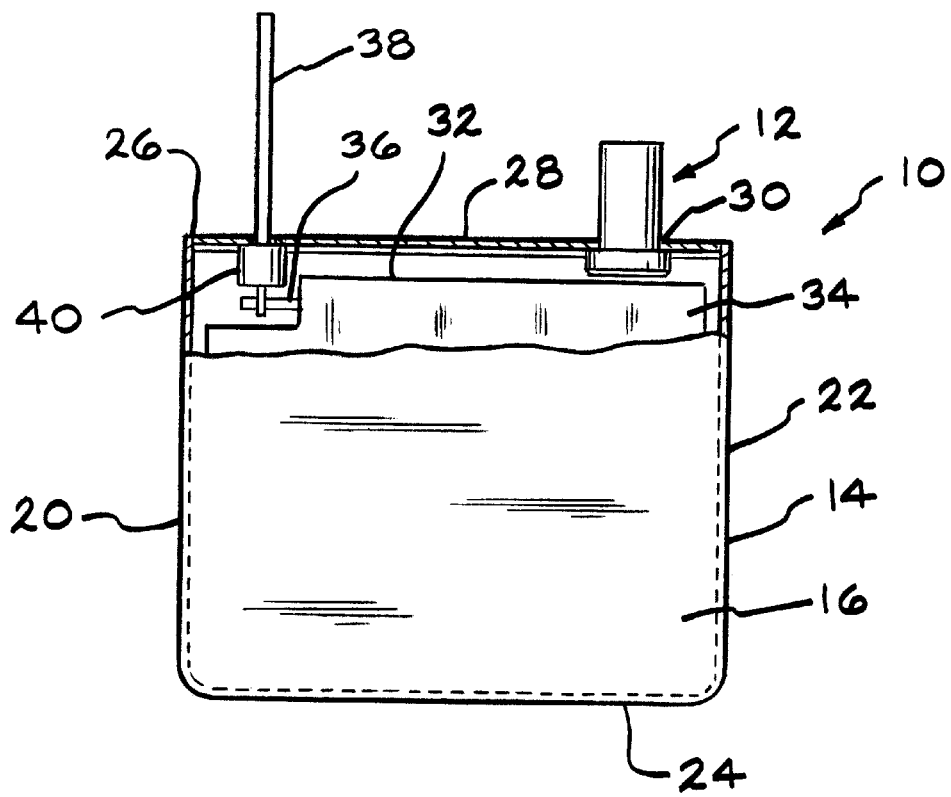
FIG. 1 is a side elevational view, partly broken away, of an exemplary secondary electrochemical cell 10 including a one-way gas relief valve 12 according to the present invention.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode or negative electrode comprises a material capable of intercalating and de-intercalating the anode active material, such as the alkali metal material, and preferably lithium. A carbonaceous anode comprising any of the various forms of carbon (e.g., coke, graphite, acetylene black, carbon black, glassy carbon, etc.) which are capable of reversibly retaining the lithium species, is preferred for the material which intercalates and de-intercalates the anode action material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Regardless of the form of the carbon, fibers of the carbonaceous material are particularly advantageous because the fibers have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical secondary cell anode is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode or positive electrode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into a cathode electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluoro-resin binder, preferably in a powder form, such as PTFE, PVDF, ETFE, polyamides and polyimides, and mixtures thereof.

The secondary cell of the present invention includes a separator to provide physical segregation between the anode and cathode electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGAD (Celanese Plastic Company, Inc.) and a membrane commercially available under the designation DEXIGLAS (C. H. Dexter, Div., Dexter Corp.).

Suitable nonaqueous electrolytes for activating the anode and the cathode are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and a cyclic carbonate selected from propylene carbonate (PC), ethylene carbonate (EC), butylene carbonate (BC) and vinylene carbonate (VC), and mixtures thereof.

In a preferred form of the present invention, the electrolyte activating the cell contains an equilibrated mixture of DMC, DEC and EMC. Ethylene carbonate is then added to the solvent system after the former three constituent are equilibrated. Preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below −50° C., and lithium ion cells activated with such mixtures have very good cycling behavior at room temperature as well as very good discharge and charge/discharge cycling behavior at temperatures below −20° C.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

For a more detailed description of an electrolyte suitable for the present invention, reference is drawn to U.S. patent application Ser. No. 09/669,936, titled "Nonaqueous Organic Electrolytes For Low Temperature Discharge of Rechargeable Electrochemical Cells", now abandoned, which is assigned to the assignee of the present invention and incorporated herein by reference.

To discharge such secondary cells, the lithium ion comprising the cathode is intercalated into the carbonaceous anode by applying an externally generated electrical potential to recharge the cell. The applied recharging electrical potential serves to draw the alkali metal ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and is discharged in a normal manner.

An important aspect of the manufacturing process for a lithium-ion rechargeable cell is that it must be "formed" after being assembled. Formation occurs during the first couple of charge-discharge cycles. During formation, lithium ions travel through the electrolyte from the cathode to the anode upon external charging and return to the cathode during discharging of the cell. The charge capacity exceeds the discharge capacity during the first charge-discharge cycle because not all of the lithium retained by the anode is released (i.e., some is retained irreversibly). The graphite anode only becomes fully wetted during the first charging cycle when the lithium ions in the electrolyte are transported to the carbon. This causes the anode to swell. Consequently, the battery case swells. Also, decomposition of the electrolyte occurs during the first cycle causing gases (e.g., ethylene and carbon dioxide) to be produced. These gases increase the pressure in the cell and result in additional case swelling.

Figure 2:
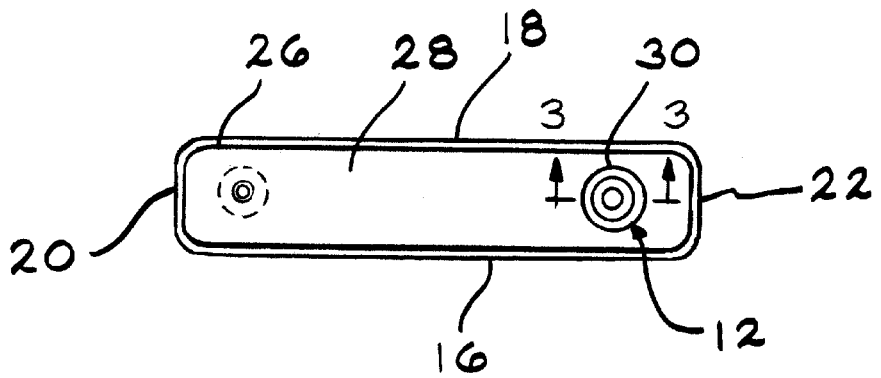
FIG. 2 is a plane view of the cell illustrated in FIG. 1.
Figure 3:
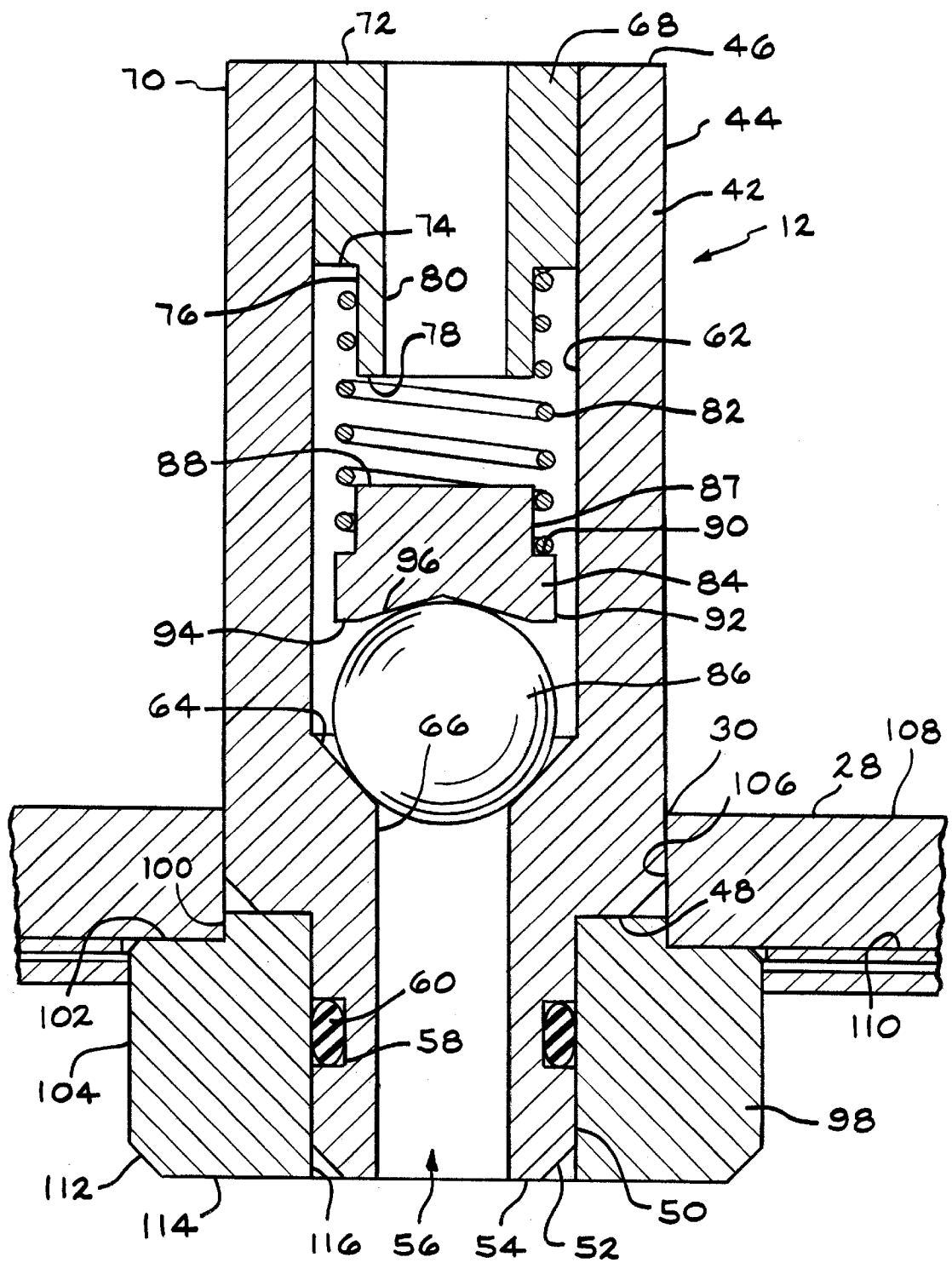
FIG. 3 is an enlarged cross-sectional view taken along line 3—3 of FIG. 2.

Turning now to the drawings, FIGS. 1 to 3 illustrate an electrochemical cell 10 according to the present invention incorporating a one-way gas release valve 12. The gas release valve 12 is mounted on the cell casing 14 and provides one-way communication for internal gaseous by-products of the electrochemical reactions of the cell to flow to the atmosphere while preventing ambient gases from entering the cell casing. After the internal gases have been vented, the valve 12 is removed from the casing 14 and replaced by a hermetic seal (not shown).

The casing 14 comprises spaced apart and generally parallel front and back side walls 16 and 18 extending to and meeting with opposed and generally parallel end walls 20 and 22. The side walls 16, 18 and end walls 20, 22 extend to and meet with a bottom wall 24. The junction between the side walls 16, 18, the end walls 20, 22 and the bottom wall 24 are curved to provide the casing 10 with a shape devoid of sharp corners. Opposite the bottom wall 24 is a surrounding edge 26 providing an opening leading into the casing 14.

After the cell components, including the anode and the cathode, are assembled inside the casing, the surrounding edge 26 is closed by a lid 28. The lid 28 is secured to the side walls 16, 18 and the end walls 20, 22 providing the surrounding edge 26, such as by welding, to provide a hermetic seal for the casing 14. The lid 28 has an opening 30 that serves as a port for filling the casing with an electrolyte to activate the anode and the cathode electrodes.

The cathode 32 comprises plates 34 (only one shown in FIG. 1) pressed together and bonded against a cathode current collector 36. The anode comprises plates (not shown) in operative contact with the opposed major faces of the cathode. A cathode terminal lead 38 is electrically insulated from the lid 28 and the casing 14 by a glass-to-metal seal 40, as is well known to those skilled in the art.

As shown in FIG. 3, the one-way gas release valve 12 of the present invention comprises a vent stack 42 having a first cylindrically-shaped side wall 44 extending from a first distal end wall 46 to a step 48 which leads to a second cylindrically-shaped side wall 50. The outer diameter of the first side wall 44 is greater than that of the second side wall 50. The second side wall 50 extends to a beveled edge 52 which meets a proximal end wall 54 leading to an interior channel 56 of the vent stack. An annular channel 58 is formed in the second side wall 50, about mid-way between the step 48 and the proximal end wall 54. The channel 58 supports an O-ring 60.

The interior channel 56 is formed by a first cylindrically-shaped bore 62 which resides interior of the first side wall 44. The first bore 62 leads to a frusto-conical funnel 64 extending downwardly and inwardly to a second cylindrically-shaped bore 66. The second bore 66 resides interior of a portion of the first side wall 44, the step 48 and the second side wall 50, and leads to the proximal end wall 54.

A chimney member 68 is secured inside the first bore 62 of the vent stack 42. The chimney member 68 has a third cylindrically-shaped side wall 70 extending from a first distal end wall 72 to a step 74 which leads to a fourth cylindrically-shaped side wall 76. The fourth side wall 76 is of a lesser outer diameter than the third side wall 70 and meets a second proximal end wall 78 leading to an interior bore 80 of the chimney. The outer diameter of the third side wall 70 is sized to be in a press-fit, gas impermeable relationship with the first bore 62 and with the first and second distal end walls 46 and 72 being coplanar.

The step 74 and fourth side wall 76 of the chimney 68 are sized to guide and support the distal end of a coil spring 82. The coil spring 82 is disposed co-axial with the longitudinal axis of the first and second bores 62 and 66 of the vent stack 42 and with the third bore 80 of the chimney 68. The proximal end of spring 82 biases a guide member 84 against a ball-bearing 86 seated in the funnel 66 to selectively block fluid flow communication between the interior of the cell casing 14 through the second bore 66 of the vent stack 42 and to the atmosphere through the first bore 62 of the vent stack 42 and the third bore 80 of the chimney 68. The guide 84 has a fifth cylindrically-shaped side wall 87 extending from an end wall 88 to a step 90 that meets a sixth cylindrically-shaped side wall 92. The sixth side wall 92 meets an annular end wall 94 that surrounds a frusto-conical surface 96 extending inwardly and toward the end wall 88. That way, the ball bearing 86 is captured between the funnel-shaped surface 64 and the frusto-conical surface 96 and is biased in this position by the force of spring 82.

A ferrule 98 is secured to the inside of the lid 28 to partially block the opening 30 leading into the casing 14. The ferrule has a seventh cylindrically-shaped side wall 100 extending to a step 102 meeting an eighth cylindrically-shaped side wall 104. The outer diameter of the side wall 100 is sized to be in a press-fit, gas impermeable relationship with an annular side wall 106 defining the opening 30 between an outer wall 108 and an inner wall 110 of the lid 28. This provides for mounting the ferrule 98 in the opening 30 with the step 102 sealed to the annular side wall 106 and the inner wall 110 of the lid 28.

The eighth side wall 104 extends to an annular bevel 112 which meets a proximal end wall 114 extending to an interior bore 116. The bore 116 is sized to receive the second cylindrically-shaped side wall 50 of the vent stack 42 in a closely-spaced relationship while the O-ring 60 serves to prevent gases from communicating past the bore 116 of the ferrule 98.

That way, before the above described secondary electrochemical cell is placed in service, such as by being the power source for an implantable medical device, the cell is cycled between a discharged condition and a charged condition. This initial cycling is referred to as formation cycling and continues for several cycles. The reason for formation cycling is to wet the carbonaceous anode active material with lithium. During this break-in period, gaseous by-products are formed inside the casing. In order to eliminate them and to minimize case swelling throughout the remainder of the cell's discharge life, the present one-way gas release valve 12 is provide to vent these gases. Once formation cycling is completed, the gas release valve 12 is removed from the casing and the lid opening 30 is hermetically sealed with a closure member (not shown). A suitable hermetic seal is shown in U.S. Pat. Nos. 5,776,632 and 6,117,195, both to Honegger, which are assigned to the assignee of the present invention and incorporated herein by reference.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by the problems associated with handling lithiated carbon outside of the cell. Lithiated carbon tends to react with explosive results when contacted by air.

The preferred chemistry for the present rechargeable cells has a positive electrode of 91% $LiCoO_2$, 6% graphite additive and 3% PVDF binder, by weight, contacted to an aluminum foil current collector, and a negative electrode of 91.7% graphite and 8.3% PVDF binder, by weight, on an upper foil. This couple is activated with quaternary carbonate solvent system of DMC, DEC, EMC and EC having a lithium salt electrolyte dissolved therein.

The metallic case for this secondary chemistry may comprise materials such as stainless steel, mild steel, nickelplated mild steel, titanium or aluminum, but not limited thereto, so long as the metallic material is compatible for use with components of the cell. The glass used for the glass-to-metal seal 40 is of a corrosion resistant type having up to about 50% by weight silicon such as CABAL 12, TA 23, FUSITE 425 or FUSITE 435. The positive terminal pin 38 preferably comprises molybdenum although titanium, aluminum, nickel alloy, or stainless steel can also be used. The cathode current collector 36 is welded to the positive terminal pin 38 in the glass-to-metal seal 40 and the lid 28 is welded to the casing 14 containing the electrode assembly. The cell is thereafter filled with the electrolyte solution described hereinabove, and hermetically sealed such as by close-welding a stainless steel ball over the fill hole 30, but not limited thereto.

This above assembly describes a case-negative cell which is the preferred construction for the exemplary secondary cell of the present invention. As is well known to those skilled in the art, the electrochemical system of the present invention can also be constructed in a case-positive configuration.

It will be readily understood by those skilled in the art that while the gas release valve of the present invention has been described with respect to a secondary, lithium-ion cell, it is also useful with other electrochemical chemistries. For example, the gas release valve is useful for primary lithium/silver vanadium oxide cells, which are typically subjected to an initial predischarge burn-in period that depletes them of approximately 1% of their theoretical capacity. After the burn-in period is completed, the gas release valve is removed from the casing and replaced by a hermetic seal in a similar manner as described above.

Figure 4:
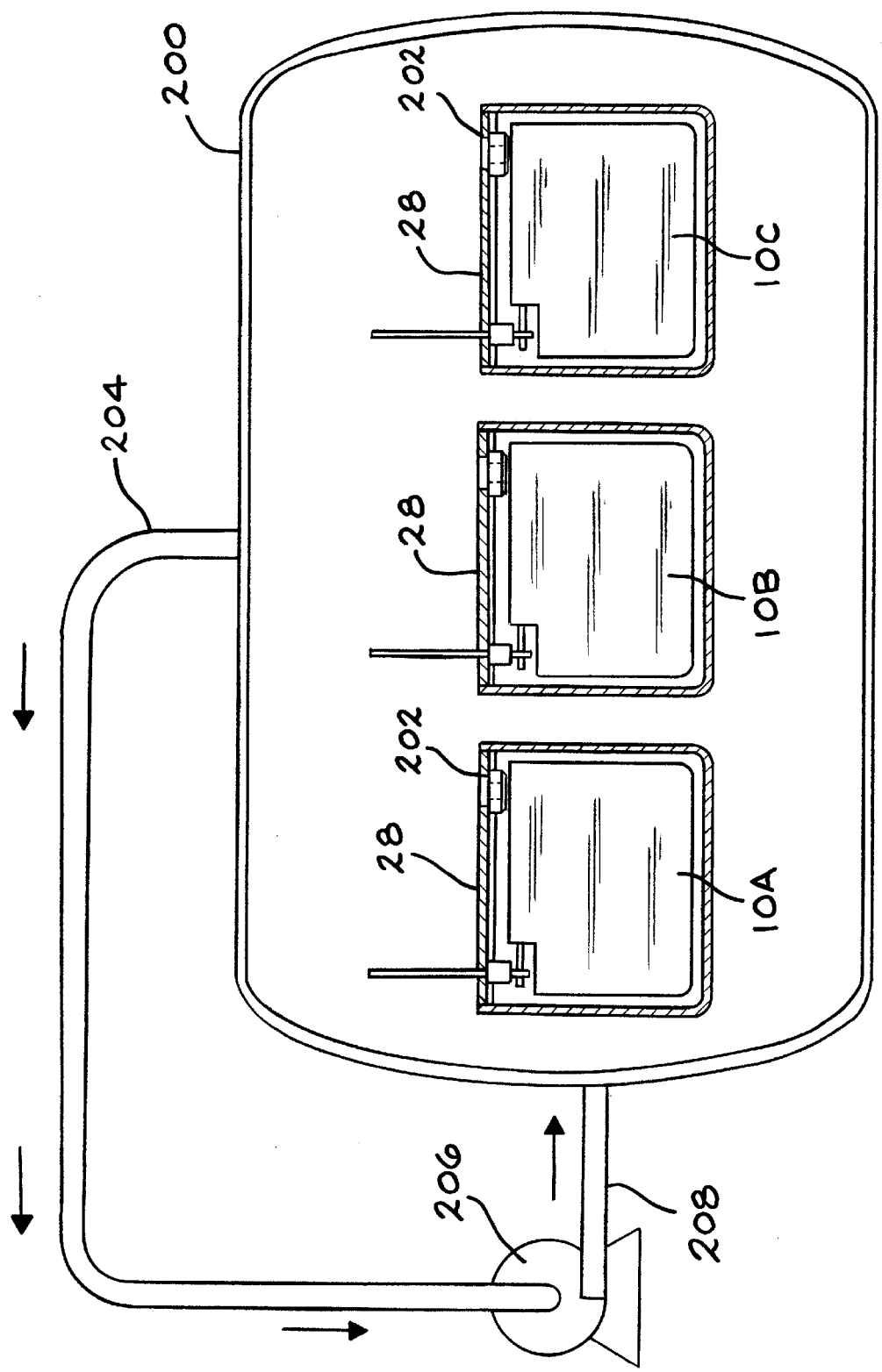
FIG. 4 is a schematic view of a housing for simultaneously forming several cells at once.

FIG. 4 illustrates another embodiment of a gas release apparatus according to the present invention. In this system, a plurality of lithium-ion cells 10A, 10B and 10C, similar to those described in FIGS. 1 to 3, are housed inside a tank 200. Instead of the previously described gas release valve 12, cells 10A to 10C have a vent 202 in their lids 28 providing fluid flow communication between their interior and the interior of the tank 200. The tank is provided with an inert environment such as nitrogen, argon and the like. An outflow conduit 204 communicates between the interior of the tank 200 and a pump 206. While not shown, the pump 206 includes a filter for separating the inert gas from gaseous by-products produced during the formation stages of the lithium-ion cells in the tank. Separating the inert gas from the gaseous by-products of formation is well known by those skilled in the art. The thusly purified inert gas is returned to the tank 200 through conduit 208.

As with the gas release valve 12 shown in FIGS. 1 to 3, once formation cycling is completed, a closure member (not shown) is moved into the opening created when the vent 202 is removed to hermetically seal the cells 10A to 10C, such as in a manner similar to the previously discussed Honegger patents.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
   a) a casing comprising a container having a container opening closed by a lid secured to the container, wherein the container and lid provide the casing having a casing side wall with a casing opening allowing for access into the casing interior;
   b) a negative electrode of a negative electrode active material which intercalates and deintercalates with an alkali metal;
   c) a positive electrode comprising a positive electrode active material which intercalates and deintercalates with the alkali metal; and
   d) an electrolyte solution activating the negative and positive electrodes, wherein the casing opening provides fluid flow communication between the casing interior and a gas release device that selectively provides for cell gas inside the casing to vent to outside the casing.

2. The electrochemical cell of claim 1 wherein the gas release device is a removable gas release valve received in a gas tight, sealed relationship with a surrounding side wall of the casing opening.

3. The electrochemical cell of claim 2 wherein the removable gas release valve is replaceable with a seal.

4. The electrochemical cell of claim 2 wherein the gas release valve has an O-ring seated in a channel in an outer wall thereof, the outer wall sized to be received in the gas tight, sealed relationship with the surrounding side wall of the casing opening.

5. The electrochemical cell of claim 2 wherein the gas release valve has an interior through bore with a seat supporting a ball bearing biased into a position closing the through bore.

6. The electrochemical cell of claim 5 wherein the ball bearing is biased into the closed position by a coil spring.

7. The electrochemical cell of claim 6 wherein a first guide of the gas release valve is partially surrounded by a distal end of the coil spring and a second guide is partially surrounded by a proximal end of the coil spring.

8. The electrochemical cell of claim 7 wherein the second guide has a frusto-conical surface which contacts the ball bearing.

9. The electrochemical cell of claim 1 wherein the electrolyte comprises ethylene carbonate, dimethyl carbonate, ethylmethyl carbonate and diethyl carbonate.

10. The electrochemical cell of claim 1 wherein the negative electrode active material is selected from the group consisting of hairy carbon, coke, carbon black, graphite, acetylene black, carbon fibers, glassy carbon, and mixtures thereof.

11. The electrochemical cell of claim 1 wherein the alkali metal intercalated electrode active material is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

12. A system for providing an electrochemical cell, which comprises:
   a) a tank having selective access into its interior from a position outside the tank, the tank being of a sufficient size to house at least one electrochemical cell moved into its interior from outside the tank;
   b) an electrochemical cell comprising:
      i) a casing comprising a container having a container opening closed by a lid secured to the container, wherein the container and lid provide the casing having a casing side wall enclosing a casing interior accessable through a casing opening;
      ii) a negative electrode of a negative electrode active material which intercalates and deintercalates with an alkali metal;
      iii) a positive electrode comprising a positive electrode active material which intercalates and deintercalates with the alkali metal; and v) an electrolyte solution activating the negative and positive electrodes housed inside the casing;

c) an inert gas provided inside the tank;

d) wherein the electrochemical cell is positionable inside the tank with the casing opening supporting a removable vent providing fluid flow communication between the casing interior and the inert gas in the tank;

e) wherein the cell is cyclable between a discharged condition and a charged condition while inside the tank;

f) a filter inside the tank for separating the inert gas from gaseous by-products produced by cycling the cell; and g) a seal for closing the casing opening after the vent has been removed therefrom.

13. The system claim 12, wherein the inert gas is selected from nitrogen and argon.

14. An electrochemical cell, which comprises:
a) a container having a container opening;
b) a negative electrode;
c) a positive electrode;
d) an electrolyte solution activating the negative and positive electrodes housed inside the container through the container opening;
e) a lid closing the container opening, wherein the lid has a thickness defined by opposed inner and outer sides extending to and meeting with an intermediate lid side wall surrounding a lid opening;
g) a removable gas release valve received in a gas tight, sealed relationship with the surrounding side wall of the lid opening, wherein the gas release valve selectively provides for gas inside the casing to vent to outside the casing; and
g) wherein the gas release valve is removable from the lid opening with the lid opening being closable by a seal.

15. The electrochemical cell of claim 14 as a primary cell of a lithium anode and a silver vanadium oxide cathode.

16. The electrochemical cell of claim 15 as a secondary cell, wherein the negative electrode is of a negative electrode active material which intercalates and deintercalates lithium and the positive electrode is of a lithiated electrode active material which intercalates and deintercalates with lithium.

17. The electrochemical cell of claim 14 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

18. The electrochemical cell of claim 16 wherein the negative electrode active material is selected from the group consisting of hairy carbon, coke, carbon black, graphite, acetylene black, carbon fibers, a glassy carbon, and mixtures thereof.

19. The electrochemical cell of claim 16 wherein the negative electrode active material is mixed with a fluoro-resin binder.

20. The electrochemical cell of claim 16 wherein the lithiated electrode active material is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

21. The electrochemical cell of claim 16 wherein the lithiated electrode active material is mixed with a fluoro-resin binder.

22. The electrochemical cell of claim 16 wherein the lithiated electrode active material is mixed with a conductive addition selected from the group consisting of acetylene black, carbon black, graphite, nickel powder, aluminum powder, titanium powder, stainless steel powder, and mixtures thereof.

23. An electrochemical cell, which comprises:
a) a container having a container opening;
b) a negative electrode of a carbonaceous material which intercalates and deintercalates with lithium;
c) a positive electrode comprising lithium cobalt oxide which intercalates and deintercalates with lithium;
d) an electrolyte solution activating the negative electrode and the positive electrode housed inside the container through the container opening;
e) a lid closing the container opening, wherein the lid has a thickness defined by opposed inner and outer sides extending to and meeting with an intermediate side wall surrounding a lid opening;
f) a removable gas release valve received in a gas tight, sealed relationship with the surrounding side wall of the lid opening, wherein the gas release valve selectively provides for gas inside the casing to vent to outside the casing; and
g) wherein the gas release valve is removable from the lid opening with the lid opening being closable by a seal.

24. A gas release valve for temporarily mounting in an opening provided in a surrounding side wall of a container, the gas release valve comprising:
a) a vent stack having a surrounding side wall providing an internal bore communicating between a first open end and a second open end of the vent stack;
b) a frusto-conically shaped seat formed by the inner side wall of the vent stack;
c) a ball seated in the frusto-conically shaped seat to block fluid flow communication through the internal bore;
d) a coil spring comprising first and second ends, wherein a first end of the coil spring surrounds a chimney providing a portion of the internal bore of the vent stack and the second end of the coil spring surrounds a guide having an opposed frusto-conical surface contacting the ball seated in the seat by the spring biasing against the chimney and the guide;
e) a surrounding channel provided in an outer surface of the side wall of the vent stack spaced intermediate the first open end and the second open end; and
f) an O-ring received in the surrounding channel.

25. The gas release valve of claim 24 wherein the surrounding side wall of the container comprises a casing for an electrochemical cell.

26. A method for providing an electrochemical cell, comprising the steps of:
a) providing a casing having a side wall with a casing opening;
b) providing a negative electrode comprising a negative electrode active material which intercalates and deintercalates with an alkali metal;
c) providing a positive electrode comprising a positive electrode active material which intercalates and deintercalates with the alkali metal;
d) activating the negative electrode and the positive electrode housed inside the casing with an electrolyte; and
e) positioning a gas release device in fluid flow communication with the casing opening for selectively providing for cell gas inside the casing to vent to outside the casing.

27. The method of claim 26 wherein the gas release device is a gas release valve received in a removable, gas tight relationship with respect to the casing opening, and further comprising the steps of:
   a) removing the gas release valve from the casing opening once the gas inside the casing has been released, wherein the gas release valve is removed in an environment which does not permit gas to enter the casing; and
   b) hermetically sealing the casing opening.

28. The method of claim 26 including providing the release device as a tank of sufficient size to house at least one cell having the casing opening in fluid flow communication between the interior of the cell and the interior of the tank, and wherein the tank is provided with an inert gas.

29. The method of claim 28 including filtering the cell gas from the inert gas and returning the inert gas to the tank.

30. The method of claim 28 including selecting the inert gas from the group consisting of nitrogen and argon.

31. The method of claim 26 including providing electrolytes having an alkali metal salt dissolved in a quaternary nonaqueous carbonate solvent mixture comprising ethylene carbonate, dimethyl carbonate, ethylmethyl carbonate and diethyl carbonate.

32. The method of claim 31 wherein the ethylene carbonate is in the range of about 20% to about 50%, the dimethyl carbonate is in the range of about 12% to about 75%, the ethylmethyl carbonate is in the range of about 5% to about 45%, and the diethyl carbonate is in the range of about 3% to about 45%, by volume.

33. The method of claim 26 including selecting the negative electrode active material from the group consisting of hairy carbon, coke, carbon black, graphite, acetylene black, carbon fibers, glassy carbon, and mixtures thereof.

34. The method of claim 26 including selecting the lithiated electrode active material from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

35. A method for providing an electrochemical cell, comprising the steps of:
   a) a casing having a side wall with a casing opening;
   b) providing a negative electrode comprising a negative electrode active material which intercalates and deintercalates with lithium;
   c) providing a positive electrode comprising a lithiated electrode active material which intercalates and deintercalates with lithium; and
   d) activating the negative electrode and the positive electrode housed in the casing with an electrolyte including an alkali metal salt dissolved in a quaternary, nonaqueous carbonate solvent mixture of ethylene carbonate, dimethyl carbonate, ethylmethyl carbonate and diethyl carbonate;
   e) closing the casing opening with a lid, wherein the lid has a thickness defined by opposed inner and outer side walls extending to and meeting with an intermediate side wall surrounding a lid opening;
   f) mounting a gas release valve in a removable gas tight sealed relationship with the surrounding side wall of the lid opening, wherein the gas release valve selectively provides for gas inside the casing to vent to outside the casing;
   g) removing the gas release valve from the lid opening in an environment which does not permit gas to enter the casing; and
   h) hermetically sealing the casing opening.

* * * * *

UNITED STATES PATENT AND TRADEMARK OFFICE
CERTIFICATE OF CORRECTION

PATENT NO. : 6,586,131 B2
DATED : July 1, 2003
INVENTOR(S) : Hallifax et al.

It is certified that error appears in the above-identified patent and that said Letters Patent is hereby corrected as shown below:

Column 9,
Line 1, please delete "v)" and insert -- iv) --;
Line 30, please delete "g)" and insert -- f) --.

Signed and Sealed this

Twenty-first Day of October, 2003

JAMES E. ROGAN
*Director of the United States Patent and Trademark Office*